(12) United States Patent
Shu et al.

(10) Patent No.: US 10,034,360 B2
(45) Date of Patent: Jul. 24, 2018

(54) MONITORING OF OPERATIONAL STATUS OF STREET DEVICES

(71) Applicant: PHILIPS LIGHTING HOLDING B.V., Eindhoven (NL)

(72) Inventors: Yuan Shu, Singapore (CN); Alexandre Georgievich Sinitsyn, Veldhoven (NL); Ingrid Christina Maria Flinsenberg, Eindhoven (NL); Yi Qiang Yu, Shanghai (CN)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 320 days.

(21) Appl. No.: 14/652,734

(22) PCT Filed: Dec. 2, 2013

(86) PCT No.: PCT/IB2013/060546
§ 371 (c)(1),
(2) Date: Jun. 16, 2015

(87) PCT Pub. No.: WO2014/097029
PCT Pub. Date: Jun. 26, 2014

(65) Prior Publication Data
US 2015/0319829 A1    Nov. 5, 2015

(30) Foreign Application Priority Data
Dec. 17, 2012  (WO) ................ PCT/CN2012/086783

(51) Int. Cl.
*H05B 37/03*    (2006.01)
*G06Q 10/00*    (2012.01)

(52) U.S. Cl.
CPC ............. *H05B 37/03* (2013.01); *G06Q 10/20* (2013.01); *H05B 37/034* (2013.01)

(58) Field of Classification Search
CPC .............................. H05B 37/03; H05B 37/034
See application file for complete search history.

(56) References Cited

U.S. PATENT DOCUMENTS

| | | | |
|---|---|---|---|
| 6,993,430 B1 | 1/2006 | Bellesfield | |
| 2004/0105264 A1* | 6/2004 | Spero | B60Q 1/04 362/276 |
| 2005/0001739 A1 | 1/2005 | Sudou | |
| 2007/0057807 A1 | 3/2007 | Walters | |
| 2007/0208498 A1 | 9/2007 | Barker | |
| 2007/0263222 A1 | 11/2007 | Loveless | |
| 2008/0158244 A1 | 7/2008 | Hulet | |
| 2011/0054777 A1 | 3/2011 | Rossio | |

(Continued)

FOREIGN PATENT DOCUMENTS

| | | |
|---|---|---|
| CN | 201550336 U | 8/2010 |
| CN | 201557301 U | 8/2010 |
| CN | 102143635 A | 8/2011 |

(Continued)

*Primary Examiner* — Douglas Menz (57) ABSTRACT

A computing unit (10) and a method are provided. The method comprises obtaining data being indicative of operational statuses and geographic positions of a plurality of street devices (11), and obtaining region description data for a region in which the street devices are located. Further, the geographic positions and operational statuses of the street devices are correlated with the region description data.

10 Claims, 3 Drawing Sheets

(56) References Cited

U.S. PATENT DOCUMENTS

2017/0336061 A1* 11/2017 Riedel ................ F21V 23/0442

FOREIGN PATENT DOCUMENTS

| | | |
|---|---|---|
| CN | 101799991 B | 1/2012 |
| CN | 102823328 A | 12/2012 |
| GB | 2368905 A | 5/2002 |
| JP | 2004119030 A | 4/2004 |
| JP | 2006300571 A | 11/2006 |
| JP | 2009229108 A | 10/2009 |
| KR | 2010136186 A * | 12/2010 |
| WO | 200195646 A1 | 12/2001 |

* cited by examiner

MONITORING OF OPERATIONAL STATUS OF STREET DEVICES

CROSS-REFERENCE TO PRIOR APPLICATIONS

This application is the U.S. National Phase application under 35 U.S.C. § 371 of International Application No. PCT/IB2013/060546, filed on Dec. 2, 2013, which claims the benefit of Chinese Patent Application No. PCT/CN2012/086783, filed on Dec. 17, 2012. These applications are hereby incorporated by reference herein.

FIELD OF THE INVENTION

The present invention generally relates to the field of street devices, such as road lamps.

BACKGROUND OF THE INVENTION

Street devices, such as road lamps and traffic enforcements cameras, in town districts (or local districts) are normally high in number and spread over rather large geographical areas, which makes maintenance and planning with respect to the street devices complicated and costly. Further, as a purpose of such street devices normally is to increase safety for drivers and pedestrians, travelling in areas absent of properly working street devices may increase the risk of accidents, which is undesirable.

SUMMARY OF THE INVENTION

It would be desirable to overcome, or at least alleviate, these problems, and to facilitate maintenance and/or planning with respect to street devices. To better address these concerns, a method and a computing unit as defined in the independent claims are presented. Preferable embodiments are defined in the dependent claims.

According to a first aspect of the present invention, a method is provided. The method comprises obtaining data being indicative of operational statuses and geographic positions of a plurality of street devices, and obtaining region description data for a region in which the street devices are located. Further, the geographic positions and operational statuses of the street devices are correlated with the region description data.

According to a second aspect of the present invention, a computing unit is provided. The computing unit is configured to obtain data indicative of operational statuses and geographic positions of a plurality of street devices, and obtain region description data for a region in which the street devices are located. The computing unit is further configured to correlate the geographic positions and operational statuses of the street devices with the region description data.

Information about operational status of street devices may be used for maintenance and planning with respect to street devices. Gathering of such information may be made manually by a person or team going out to each street device to check the operational status. Street device are commonly spread over rather large geographical areas, which makes manual gathering of information cumbersome and costly.

According to the present aspects, the correlation of the geographic positions and operational statuses of the street devices with the region description data may provide a survey of the conditions of the street devices in a region (or area). The correlation may facilitate maintenance and/or planning with respect to the street devices. For example, the correlation may be used for planning/performing maintenance (or service) routes, infrastructure planning and/or any route planning with respect to the street devices. For example, the correlation may indicate which street devices are in need of maintenance and/or which roads and/or subareas in the region where functionality of the street devices is high or low. As maintenance and/or planning with respect to the street devices is facilitated, actions to be taken in this respect are also facilitated and therefore the probability of travelling (or transfer) in areas absent of properly working street devices may be reduced, either because of higher rate of properly working street devices in the region and/or because of the improved possibility to plan a route to avoid areas absent of street devices or properly working street devices.

It will be appreciated that the words "road" and "street" may be used interchangeably in the present specification and may be broadly interpreted as any road, street, highway, track or path for traveling or transfer by vehicle or by foot.

According to an embodiment of the present invention, the step of obtaining data being indicative of operational statuses and geographic positions of a plurality of street devices may comprise receiving data from a plurality of street devices, the data being indicative of an operational status and a geographic position of each street device. The present embodiment is advantageous in that data indicative of (or relating to) the operational status and geographic position is received (directly or indirectly) from the street device, which provides a more authentic overview of the street devices, as it may relate to the actual operational statuses and positions rather than predetermined default operational statuses and positions.

According to an embodiment of the present invention, the street devices may be road lamps. High numbers of road lamps may be present in regions such as urban areas and along highways. The method according to the present embodiment facilitates maintenance and/or planning with respect to the road lamps in such regions.

According to an embodiment, the method may further comprise estimating lighting conditions at roads and/or in subareas in the region in which the street devices are located based on the region description data and the data received from the street devices. Estimating (or calculating) lighting conditions (or illumination level) may provide an overview of the available illumination at the roads and/or in the subareas in the region, which may be used for route planning/advising and/or maintenance with respect to the road lamps. Further, the estimation of lighting conditions may be used in infrastructure planning to investigate which roads/subareas are well or poorly lit.

According to an embodiment, the method may further comprise obtaining a starting point and calculating a route based on the starting point and the correlation of the operational statuses of the street devices and their geographic positions with the region description data. Accordingly, the computing unit may be further configured to obtain a starting point, and calculate a route based on the starting point and the correlation of the operational statuses of the street devices and their geographic positions with the region description data. Hence, the route (or travel route) may be adapted to the operational statuses and the locations of the street devices. For example, the route may be calculated to pass street devices with a particular operational status, such as working or non-working street devices. Optionally, a destination may also be obtained and the route may be calculated also based on the destination.

In an embodiment, the method may comprise obtaining a starting point and a destination (or end point) and calculating a route based on the starting point, the destination and the estimated lighting conditions. For example, the route may be calculated (or computed) to pass well lit roads, such as roads with an average luminance level over a certain threshold. Further, the route may be calculated as the (at least almost) shortest and/or fastest well lit route from the starting point to the destination. Hence, an improved routing advice (or planning tool) is provided, taking into account lighting conditions in the region.

According to an embodiment, the route may be calculated to pass at least some of the street devices for which the received data indicates a need for service of the street device. Hence, a service (or maintenance) route may be provided to facilitate maintenance of the street devices. Preferably, the route may be calculated to be (at least almost) the shortest and/or fastest route passing the street devices with service needs. The present embodiment is advantageous in that maintenance of the street devices is rendered more effective, which reduces costs and demand on manpower. Further, planning of the service route is facilitated.

According to an embodiment, the method may further comprise receiving data indicative of availability and/or a current position of at least one maintenance brigade for performing service of the street devices. Calculating the route may then further be based on the received data indicative of availability and/or a current position of the at least one maintenance brigade, thereby rendering maintenance of the street devices even more effective. For example, the current position of the at least one maintenance brigade may be the starting point for the route. The destination may e.g. be one of the street devices (such as the last street device on the route in need of service) or a center (or gathering point) for the maintenance brigades. The destination may be the same as the starting point. Further, e.g. if several maintenance brigades are available, one route per maintenance brigade may be calculated.

It will be appreciated that the terming "maintenance brigade" may include any person or team assigned to perform maintenance (or service) of street devices. The position of the maintenance brigade may e.g. be the position of the vehicle for transporting the person or team. For example, the position of the maintenance brigade may be a GPS position received wirelessly from the maintenance brigade and/or a message (e.g. sent upon request) from the maintenance brigade.

According to an embodiment, obtaining data indicative of the operational statuses of the street devices and correlating the geographic positions and operational statuses of the street devices with the region description data may be performed in a repetitive manner. Hence, the correlation may be continuously updated with respect to the operational status of the street devices, which is advantageous in that the correlation corresponds to a more up-to-date authentic overview of the street devices.

According to an embodiment, the obtained data may be indicative of a current operational status of each street device or a future operational status estimated based on a current operational status of each street device, which is advantageous in that the correlation is obtained based on the current conditions of the street devices, which provides a more authentic overview of the street devices. The operational status of a street device may be monitored or (measured) continuously, at predetermined time intervals and/or at request from the computing unit in order to obtain data on which the correlation may be based.

According to an embodiment, the data indicative of operational statuses and geographic positions of a plurality of street devices may be transmitted automatically from the street devices. In the present specification, the automatic transmission of data means transmission of data from the street device to the computing unit in any non-manual manner (i.e., not involving a human), such as by radio communication or wired electronic/optic communication. For example, a radio signal (or any wireless signal) representing the operational status and position of the street device may be transmitted from the street device and received by the computing unit or by an intermediate controller, which in turn transmits the data to the computing unit e.g. via Ethernet. The automatic transmission may be made continuously, at predetermined time intervals and/or upon request (e.g. from the computing unit).

In an embodiment, the method may further comprise presenting the correlated geographic positions and operational statuses of the street devices in a map. The present embodiment facilitates getting a survey of the conditions of the street devices in the region. In an embodiment, the map may represent the estimated lighting conditions, thereby further facilitating maintenance and/or planning with respect to the road lamps. In an embodiment, the map may represent the calculated route, thereby giving an overview of the route.

According to an embodiment, a system for monitoring operational statuses of a plurality of street devices is provided. The system may comprise a computing unit according to the second aspect (or any of the embodiments derived from the second aspect), and a plurality of monitoring units, each monitoring unit being adapted to monitor an operational status of at least one street device and transmitting (directly or indirectly) data indicative of an operational status and a geographic position of the at least one street device to the computer unit.

It is noted that the invention relates to all possible combinations of features recited in the claims. Further, it will be appreciated that the various embodiments described for the method are all combinable with the computing device as defined in accordance with the second aspect of the present invention.

Further objectives of, features of, and advantages with, the present invention will become apparent when studying the following detailed disclosure, the drawings and the appended claims. Those skilled in the art realize that different features of the present invention can be combined to create embodiments other than those described in the following.

BRIEF DESCRIPTION OF THE DRAWINGS

These and other aspects of the present invention will now be described in more detail, with reference to the appended drawings showing embodiments of the invention.

All the figures are schematic, not necessarily to scale, and generally only show parts which are necessary in order to elucidate the invention, wherein other parts may be omitted or merely suggested.

DETAILED DESCRIPTION

A system for monitoring operational statuses of a plurality of street devices according to an embodiment of the present invention will be described with respect to FIG. 1.

Figure 1:
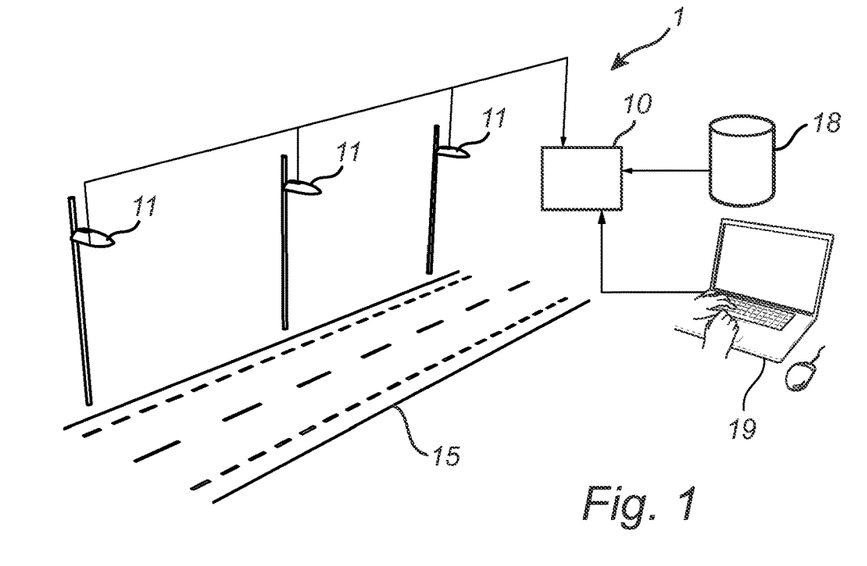
FIG. 1 shows a system for monitoring operational status of a plurality of street devices according to an embodiment of the present invention.

FIG. 1 shows a system 1 comprising a computing unit 10 in communication with monitoring units, each monitoring unit being arranged to monitor an operational status of at least one street device 11. Hence, a single monitoring unit may be configured to monitor one or several lighting devices 11 with respect to operational status. The monitoring units may e.g. be mounted in (or at or in the vicinity of) the street devices 11. In the present example, the street devices 11 are road lamps arranged to illuminate a road 15 but may alternatively be any other kind of street devices, such as traffic enforcements cameras or traffic lights. The computing unit 10 may be in communication with a user interface 19 and a database 18 (or memory or any other means) for storing region description data. The region description data may e.g. be a region map (such as a road map or geographical map) and/or data indicative of industrial areas, parks, museums parking lots, average number of people in the region or any other information which may be utilized to prioritize regions e.g. with respect to maintenance urgency. The region description data may be presented e.g. in a map and/or a table over a region in which the street devices 11 are located.

Each monitoring unit may be configured to continuously and/or at predetermined time intervals and/or upon request (e.g. from the computing unit 10) measure (or check) the operational status of the street device 11. The operational status may e.g. be indicated by parameters such as light output, energy consumption or any other parameter relating to the operational condition of the street device 11. Further, the operational status of the street device 11 may be indicated by a failure signal. The monitoring units may be configured to automatically transmit the failure indication signal in case the street device is (or is soon) out of function.

Further, the monitoring units may be configured to store or measure the geographical positions of the street devices 11. For example, a monitoring unit (or the street devices) may comprise a GPS receiver for obtaining a GPS position of the street device 11.

The monitoring units may communicate (directly or indirectly) with the computing unit 10, preferably in an automatic manner. For example, the monitoring units may communicate with the computing unit 10 by means of radio (or any wireless) communication and/or wired communication such as electrical/optical communication (e.g. via Ethernet). The monitoring units may communicate via other units (e.g. servers), which in turn communicates with the computing unit. Hence, the computing unit 10 may obtain information indicative of the operational statuses and positions of the street devices 11 from a peripheral server, which has gathered such information e.g. from the monitoring units.

A method according to an embodiment of the present invention will be described with reference to FIGS. 1 and 2.

Figure 2:
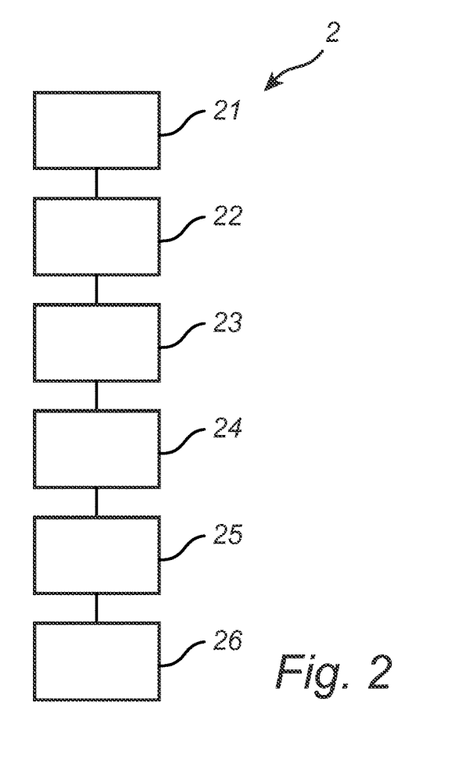
FIG. 2 shows a method according to an embodiment of the present invention.

FIG. 2 schematically shows a method 2 which may be implemented by the computing unit 10 shown in FIG. 1. For example, the method 2 may be a computer implemented method. A computer program may be provided for executing the method 2.

The method 2 comprises obtaining data indicative of the operational status of each street device 11. In the present embodiment, the data is received 21 from the street devices 11 (or the monitoring units connected to, and optionally comprised in, the street devices 11). The data is transmitted (preferably automatically) from the monitoring units (or any unit which has received the data from the monitoring units) to the computing unit 10. The data may e.g. be indicative of the current light output and/or energy consumption of the street device and/or may be a failure indication signal indicative of failure in the street device, such as light out. The data may also be indicative of a future operational condition of a street device estimated (e.g. by the monitoring unit) based on the current operational status of the street device 11. Additional data, such as lamp type, lamp wattage and lamp on/off time may also be sent to the computing unit 10. Further, the data from the street devices 11 is indicative of the position of each street device 11. The street device 11 may for e.g. send its GPS position.

The method 2 further comprises obtaining 22 region description data for the region in which the street devices 11 are located. The region description data may be transmitted (or retrieved) from the database 18. The region description data may be a (geographic) map (such as a road map) over the region in which the street devices 11 are located. For example, the geographic data may be retrieved from the Internet from an on-line map provider. The geographic data may provide information such as road type (e.g. straight or curved road, roundabout and bridge).

The method 2 further comprises correlating 23 the geographic positions and operational statuses of the street devices 11 with the region description data. For example, the correlation may be provided as a map, table or any other storage/display format pointing out where (at least some of) the street devices 11 are located and indicating their operational status.

In the present embodiment, the method 2 may further comprise estimating 24 lighting conditions at roads and/or in subareas in the region in which the street devices 11 are located based on the region description data and the data received from the street devices 11. The lighting conditions may be indicated by any parameter relating to the illumination at the roads. For example, the road surface illumination (obtained by the road lamps 11) may be calculated. The light from a road lamp propagates in various directions until it strikes a surface. The amount of light falling, per unit area, on the surface is called the luminance, and is measured in lumens per square meter or lux (lx). As the light source in the road lamp is mounted several meters above the ground (i.e. the illuminated surface), the light source may be assumed to be a point light source. The luminance on a surface having a plane perpendicular to an direction of the light emitted by the light source may therefore be considered to be the intensity, I, (measured in candela, cd) divided by the square of the distance, h, (measured in meter, m) between the light source and the illuminated surface (the road surface). For light emitted by the light source of the road lamp in directions other than perpendicular to the plane of the surface, there is an angle between the (average) plane of the road and the direction of the light emitted by the light source of the road lamp. The luminance level on the road can be calculated using Equation 1:

$$E = \frac{I\cos^3\theta}{h^2} \qquad \text{(Equation 1)}$$

In Equation 1, E is the luminance (lx), θ is the angle between the light direction and the road (or average plane of the road), I is the intensity of the light source in the road lamp (cd), and h is the height of the light source of the road lamp above the road or average plane of the road (m). By using equation 1, the illumination level on the road surface may be calculated and simulated.

Figure 3:
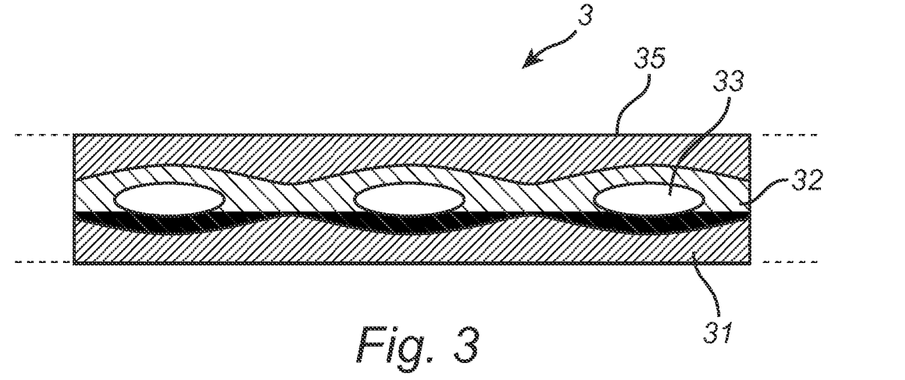
FIG. 3 shows a simulation of luminance level of a road segment according to an embodiment of the present embodiment.

FIG. 3 shows and example of a simulation 3 of lighting conditions on a road. In particular, the simulation 3 illustrates fields 31, 32, 33 having different luminance levels on a road surface segment 35. The fields 31 located right under the light sources of the road lamps have the highest luminance levels. The field 32 next to the fields 31 located right under the light sources (i.e. the fields 32 located further away from the light sources) has a lower luminance level and the field 33 even further away from the light sources has an even lower luminance level. The further the road lamps are situated apart, the lower is the luminance level at road segments in between the road lamps and the more uneven is the overall luminance level on the road.

Based on the luminance level at the roads, other measures describing the lighting conditions may be derived. For example, the uniformity of the illumination may be determined based on the variance, standard deviation, and/or spread of the luminance level of a road segment. The average luminance level and/or the glare level, which may be determined using e.g. the maximum luminance value, can also be determined. The average luminance level may be the average luminance level of a particular area, such as along a particular road distance. Further, the roads may be classified into different categories based on their luminance levels. For example, a dark road may be defined as a road where the road lamps are placed further apart than a certain distance, and/or if the average luminance level at the road is below a certain threshold. A bright road may be defined as a road having road lamps closer than a certain distance apart, and/or an average luminance level above a certain threshold. The certain distances and thresholds may further depend on the road type (e.g. motorways and walkways), and/or on the road user type (e.g. car, bicycle, pedestrian, bus).

Figure 4:
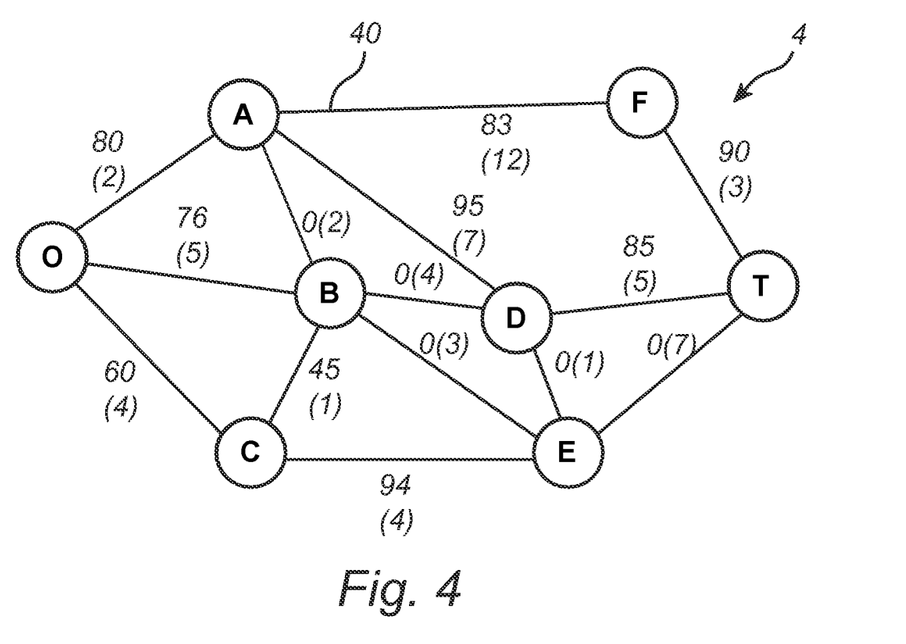
FIG. 4 shows a road illumination map according to an embodiment of the present invention.

The estimated lighting conditions may be represented in a computed map, which is a user friendly alternative of presenting the information to the user. However, other alternatives may be envisaged. A map is used for illustration purposes in the present example. The same type of information may be extracted from the digital data. Still, a map is a convenient visual medium for this purpose. FIG. 4 schematically illustrates such a map 4 presenting the lighting conditions in a region. The map 4 presents roads 40 (merely one of several roads is denoted with reference sign 40) connecting different points (or locations) A, B, C, D, E, F, O, T. At each road 40, the length of the road 40 (e.g. in kilometers) is denoted within brackets and an illumination level value of each road is denoted without brackets. The illumination value may e.g. be representative of the average luminance level on the road 40. The present map 4 may be used e.g. for planning with respect to the road lamps. For example, the map 4 may be used by a governmental lighting planning agency for planning road illumination in the region. Based on the lighting conditions, the agency may suggest to put additional road lamps on the roads 40 between B, D, and E, or only a subset thereof, and/or e.g. introduce dimming of the road lamps on the road between F and T. The map 4 may also be used for route planning with respect to road illumination. For example, a route planner (or person) may avoid travelling on roads having low or no road illumination and instead select well lit roads 40.

The correlation of the operational statuses of the street devices and their geographic positions with the region description data (e.g. being presented as the computed map 4 with illumination conditions, which also may be referred to as a road illumination map) may further be utilized for route advising, as will be described in the following. The method 2 may comprise obtaining 25 a starting point and preferably a destination. The starting point and destination may e.g. be inputted by a user to the computing unit 10 via the user interface 19 (as illustrated in FIG. 1), or derived from a GPS position of the user. The method 2 may further comprise calculating 26 a route based on the starting point, the destination and the estimated lighting conditions. For example, a route from a starting point (or origin) O to a destination T may be calculated with respect to the illumination levels on the roads. The most well-lit route may be from O to T via A and D as it has a total illumination value of 80+95+85=260, which is higher than the illumination value for a route going from O to T via A and F, which route has a total illumination value of 80+83+90=253.

For determining a route, Dijkstra's algorithm, or a derivative thereof, may be used. Dijkstra's algorithm may be used to determine the route with a minimum costs, provided that all costs are non-negative. Firstly, the lighting conditions may be translated into non-negative costs. For this purpose, a possibility is to subtract the original illumination level value from the overall maximum illumination level value, which in the present example is 95. However, other transformations may also be possible. Further, other parameters may be taken into account when planning a route, such as road length (to find out the shortest or fastest well-illuminated route), road type, toll roads, and traffic jams. A weighted combination of the costs of the individual parameters may be determined for planning the minimum cost route. According to an example, the road length and luminance cost (determined by the overall maximum illumination level value minus the illumination level value) may be compared between different route alternatives, as shown in Table I and Table II. In the present example, the route presented in Table I (O-A-D-T) is both shorter and better lit than the route presented in Table II (O-A-F-T).

TABLE I

|  | O to A | A to D | D to T | Total |
|---|---|---|---|---|
| Illumination cost | 95 − 80 = 15 | 95 − 95 = 0 | 95 − 85 = 10 | 25 |
| Road length | 2 | 7 | 5 | 14 |

TABLE II

|  | O to A | A to F | F to T | Total |
|---|---|---|---|---|
| Illumination cost | 95 − 80 = 15 | 95 − 83 = 12 | 95 − 90 = 5 | 33 |
| Road length | 2 | 12 | 3 | 17 |

The calculated route may be represented on the map 4 (not shown).

A method according to another embodiment of the present invention will be described with reference to FIGS. 1 and 5.

Figure 5:
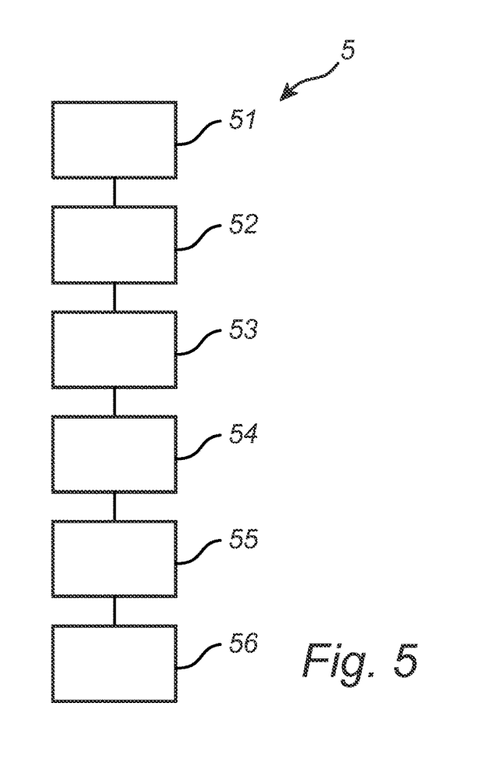
FIG. 5 shows a method according to another embodiment of the present invention.

FIG. 5 schematically shows a method 5 which may be implemented by the computing unit 10 shown in FIG. 1. For example, the method 5 may be a computer implemented method. A computer program may be provided for executing the method 5.

The first tree steps 51, 52, 53 of the method 5 may be similar to the first three steps 21, 22, 23 of the method 2 described with reference to FIG. 2. Hence, the method 5 comprises receiving 51 data from the street devices 11 (or the monitoring units comprised in the street devices 11) indicative of the operational status of each street device 11. The method 5 further comprises obtaining 52 region description data for the region in which the street devices 11 are located. Further, the geographic positions and operational statuses of the street devices 11 are correlated 53 with the region description data. For example, the correlation may be provided as a map, table or any other storage/display format pointing out where (at least some of) the street devices 11 are located and indicating their operational status.

Figure 6:
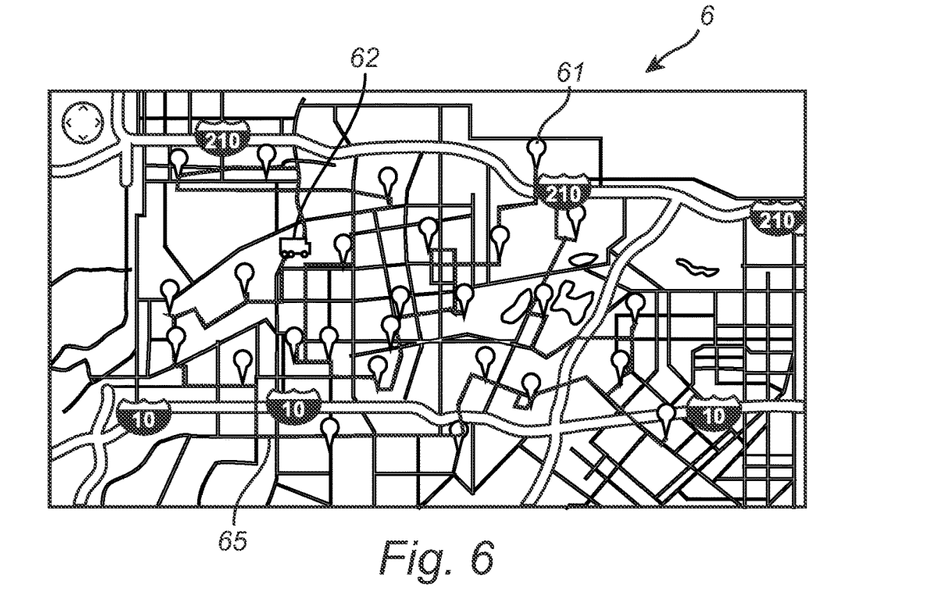
FIG. 6 shows a map representing a service route according to an embodiment of the present invention.

FIG. 6 shows a map 6 representing the correlation of the geographic positions and operational statuses of the street devices 11 with the region description data made according to the method 5 described with reference to FIG. 5. The correlation according to the present example is made to present street devices 61 (merely one of several street devices is denoted with reference sign 61), which have transmitted data indicating failure (or mal function) or close-to-end of the street device 61, i.e. street devices 61 in need of service (or maintenance). For example, the correlation according to the present example is made to present the street devices 61, which have sent a failure signal (or message) to the computing unit 10. Further, in the present example, the map 6 may represent this correlation. The map 6 may be used for maintenance planning with respect to the street devices 61. Alternatively, the correlation may be represented in a table or any other suitable storage/display means.

The correlation presenting the street devices 61 in need of service may further be utilized for service route advising, as will be described in the following. The method 6 may comprise receiving 54 data indicative of availability and/or a current position of at least one maintenance brigade 62 for performing service of the street devices 61. The method 6 may further comprise obtaining 55 a starting point, e.g. via the user interface 19 or, alternatively, the starting point may be predetermined and e.g. retrieved from a memory (or any other storing means). Alternatively, the starting point may be the current position of the maintenance brigade 62, e.g. obtained via GPS. Further, a route 65 may be calculated 56 based on the starting point, the data received from the street devices 61, the region description data, and optionally on the received data indicative of availability and/or a current position of the maintenance brigade 62. The route 65 may preferably be calculated to pass the street devices 61 in need of service and preferably such that the route 65 is (at least almost) as short as possible. If several maintenance brigades are available, several routes may be calculated. The calculation of the route may further take into account priorities of city zones (e.g. industrial zones, parking zones or road lamps with attached surveillance cameras) and service level agreements between parties (e.g. agreements restricting down time of a road lamp to a certain time period and if that time period is exceeded, penalties may be applied). The route 65, and optionally the maintenance brigade 62, may be presented on the map 6. The map 6 may e.g. be displayed electronically on a mobile device or on a vehicle dashboard.

Both methods 2, 5 described above may be repeated (such as upon clock events or on request) and the correlation, e.g. in the form of the maps 4, 6 and routes 65, may be updated accordingly.

While embodiments of the invention have been illustrated and described in detail in the drawings and foregoing description, such illustration and description are to be considered illustrative or exemplary and not restrictive; the invention is not limited to the disclosed embodiments.

For example, the computing unit may not be limited to a single hardware unit, but may be formed by several (optionally spatially separated) sub units for performing different parts of the method.

Further, the steps in the method may be performed in any feasible order. For example the step of correlation may be performed as a last step, i.e. after calculation of lighting conditions and/or any route.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method comprising:
   obtaining data being indicative of operational statuses and geographic positions of a plurality of street devices, wherein said obtaining data step comprises receiving data from at least some of the street devices;
   obtaining region description data for a region in which the street devices are located; and
   correlating the geographic positions and operational statuses of the street devices with the region description data, wherein the street devices comprises road lamps and the method further comprising:
   estimating lighting conditions at roads and/or in subareas in the region in which the street devices are located based on the region description data and the data received from the street devices;
   obtaining a starting point and a destination; and
   calculating a route based on the starting point, the destination and the estimated lighting conditions.

2. The method as defined in claim 1, wherein the route is calculated to pass roads having an average luminance level above a certain threshold.

3. The method as defined in claim 1, further comprising:
   obtaining a starting point; and
   calculating a route based on the starting point and the correlation of the operational statuses of the street devices and their geographic positions with the region description data.

4. The method as defined in claim 3, wherein the route is calculated to pass at least some of the street devices for which the received data indicates a need for service of the street device.

5. The method as defined in claim 4, further comprising:
receiving data indicative of availability and/or a current position of at least one maintenance brigade for performing service of the street devices; and
wherein calculating the route is further based on the received data indicative of availability and/or a current position of the at least one maintenance brigade.

6. The method as defined in claim 5, wherein obtaining data indicative of the operational statuses of the street devices and correlating the geographic positions and operational statuses of the street devices with the region description data is performed in a repetitive manner.

7. The method as defined in claim 1, wherein the obtained data is indicative of a current operational status of each street device or a future operational status estimated based on a current operational status of each street device.

8. The method as defined in claim 7, further comprising:
presenting the correlated geographic positions and operational statuses of the street devices in a map.

9. A computing unit configured to:
obtain data indicative of operational statuses and geographic positions of a plurality of street devices, wherein the data comprises data received from one or more street lamps indicative of the lamp's operational status and geographical position;
obtain region description data for a region in which the street devices are located; and
correlate the geographic positions and operational statuses of the street devices with the region description data;
wherein the street devices comprises road lamps and the computing unit is further configured to:
estimate lighting conditions at roads and/or in subareas in the region in which the street devices are located based on the region description data and the data received from the street devices;
obtain a starting point; and
calculate a route based on the starting point and the correlation of the operational statuses of the street devices and their geographic positions with the region description data.

10. A system for monitoring operational statuses of a plurality of street devices, the system comprising:
a computing unit as defined in claim 9, and
a plurality of monitoring units, each monitoring unit being adapted to monitor an operational status of at least one street device and transmitting data indicative of an operational status and a geographic position of the at least one street device to the computer unit.

* * * * *